United States Patent

[11] 3,625,926

[72] Inventor Rostyslaw Dowbenko
 Gibsonia, Pa.
[21] Appl. No. 887,393
[22] Filed Dec. 22, 1969
[45] Patented Dec. 7, 1971
[73] Assignee PPG Industries, Inc.
 Pittsburgh, Pa.
 Original application Apr. 14, 1966, Ser.
 No. 542,446, now Patent No. 3,530,167,
 dated Sept. 22, 1970. Divided and this
 application Dec. 22, 1969, Ser. No. 887,393

[54] ACETAL-CONTAINING MONOMERS AND NEW THERMOSETTING POLYMERS DERIVED THEREFROM
 5 Claims, No Drawings

[52] U.S. Cl.................................................... 260/78.5 B,
 117/161 UZ, 260/47 U, 260/80.75, 260/80.76,
 260/80.81, 260/86.1 R
[51] Int. Cl...................................................... C07c 69/54,
 C08f 15/10
[50] Field of Search.......................................... 260/78.5 T,
 80.3, 80.75, 80.76, 80.81, 78.5 B, 47 U

[56] References Cited
 UNITED STATES PATENTS
 3,200,099 8/1965 Lewis et al..................... 260/80.75
 3,468,857 9/1969 Graver ......................... 260/80.3

Primary Examiner—Joseph L. Schofer
Assistant Examiner—John Kight, III
Attorney—Chisholm and Spencer ABSTRACT: Novel acetal-containing compounds which are useful in thermosetting polymers and coating compositions are obtained by reacting a vinyloxy compound with a polymerizable ethylenically unsaturated hydroxyl-containing material.

ACETAL-CONTAINING MONOMERS AND NEW THERMOSETTING POLYMERS DERIVED THEREFROM

CROSS-REFERENCES TO RELATED APPLICATIONS

This application is a divisional application of U.S. Ser. No. 542,446, filed Apr. 14, 1966, now U.S. Pat. No. 3,530,167.

This invention relates to novel acetal-containing compounds and polymers and the methods of preparation thereof, and more particularly to adducts of a polymerizable ethylenically unsaturated hydroxyl-containing material and a vinyloxy compound which can be employed in producing thermosetting polymers and coating compositions.

Thermosetting coating compositions comprising cross-linked, long-chain copolymers, as for example, the acrylamide interpolymers as disclosed in U.S. Pat. No. 3,037,963, are well known and widely employed. Such copolymers usually contain a resinous "backbone" built up by vinyl addition polymerization. Along this backbone are spaced pendant chemical groups which are capable of further reaction to cross-link the copolymers and thereby produce a cured or fused coating. A number of pendant groups have been employed to provide such cross-linking sites, such as, for example, glycidyl, methylol, alkyl methylol, hydroxyl, carboxyl and urethane groups. Little interest, however, has been shown in polymers which utilize acetal groups as a means for obtaining cross-linking. Most developments in this area have been concerned with general improvements of existing polymer systems, as for example, where dihydropyran was used to prepare acrylic esters of 2-hydroxytetrahydropyran in order to mask the carboxylic acid groups and impart storage stability to copolymers containing carboxyl and glycidyl groups, as disclosed in Canadian Pat. No. 672,947. Virtually no use has been made of such acetal groups as a primary means for cross-linking.

It has now been discovered that by reacting a vinyloxy compound with a polymerizable ethylenically unsaturated hydroxyl-containing material, an adduct is formed which, when interpolymerized with another ethylenically unsaturated monomer or monomers, provides cross-linking sites on the interpolymer, the sites being pendant acetal groups. Coatings produced from such polymers possess excellent qualities of durability, adhesion, gloss and chemical and solvent resistance and may be cured at temperatures below those required for many conventional thermosetting coating compositions.

In general, the acetal-containing compounds of this invention may be represented by the formula:

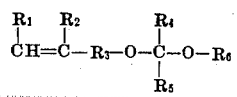

where $R_1$ and $R_2$ are each hydrogen, an alkyl radical, an aryl radical, or a carbalkoxy radical; $R_3$ is a divalent organic radical; $R_4$ is hydrogen, an alkyl radical, or an aryl radical; $R_5$ is an alkyl radical or an aralkyl radical; and $R_6$ is an alkyl radical, an aryl radical or an acyl radical.

The groups represented by $R_1$ and $R_2$ include hydrogen; alkyl radicals, preferably having one to about six carbon atoms, such as methyl, ethyl and propyl radicals; carbalkoxy radicals, also generally having about two to six carbon atoms such as carbomethoxy and carbobutoxy radicals; and aryl radicals having about one to six carbon atoms such as benzyl, phenyl methylphenyl and the like.

The substituents represented by $R_3$ in the above formula may be any divalent organic radical which can link together the vinyl and acetal groups of the compound. A preferred radical is a carbonyloxy-containing radical having the formula:

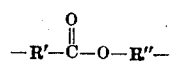

where $R'$ is an alkylene radical of zero to about five carbon atoms, such as methylene or propylene, and $R''$ is an alkylene radical of one to about six carbon atoms such as methylene, ethylene or propylene. $R_3$ may also be an oxy-containing radical having the formula:

$$-R'-O-R''$$

where $R'$ is an alkylene radical of zero to about five carbon atoms such as methylene or propylene and $R''$ is an alkylene radical of one to about five carbon atoms such as methylene or propylene or an alkylene radical of one to about six carbon atoms such as methylene, ethylene or propylene. Other groups which $R_3$ can represent include arylene radicals including alkarylene and arylalkylene, for example, phenylene, methylphenylene, benzylene, and the like; alkenylene, for instance, vinylene, 3-butylene, and linolylene; cycloalkenylene radicals such as cyclopentadienylene and 2-cyclobutynylene; as well as alkenylarylene groups such as vinylphenylene. $R_3$ may also be a substituted hydrocarbon radical, for example, a halo-substituted organic radical such as tetrachlorophenylene, 1-bromo-2-difluoropropylene, or it may be an amino-substituted hydrocarbon such as aminomethylene, 3-aminopropylene, and the like. Other substituted hydrocarbon radicals which may be included within the scope of the $R_3$ substituent are cyano-substituted hydrocarbon radicals such as 3-cyanopropylene, as well as hydroxy-substituted radicals such as hydroxypropylene or hydroxybutylene.

$R_4$ includes hydrogen, alkyl radicals of one to about five carbon atoms such as methyl, ethyl, propyl, or butyl radicals; monovalent cycloaliphatic radicals such as cyclohexyl, cyclobutyl; aryl radicals including alkylryl and arylalkyl, for example, phenyl methylphenyl and benzyl and the like; alkenyl, for instance, vinyl or aryl; cycloalkenyl radicals such as cyclopentadienyl and 2-cyclobutenyl; as well as alkenylaryl groups such as the vinylphenyl radicals.

$R_5$ includes alkyl radicals of one to about 10 carbon atoms such as methyl, ethyl, propyl, or butyl radicals; and aralkyl radicals of one to about 10 carbon atoms, such as phenyl, phenylethylene, methylphenyl and the like.

$R_6$ includes alkyl radicals of about one to 10 carbon atoms such as methyl, ethyl, propyl, or butyl radicals; acyl radicals such as acetyl, propionyl, butyryl and other similar radicals of about one to 10 carbon atoms; and aryl radicals including alkaryl and aralkyl radicals, for example, phenyl, methylphenyl, benzyl, phenylethylene and the like, generally having between about one and 10 carbon atoms.

The vinyloxy compounds essential in preparing the above-described novel compounds of this invention may be represented by the formula:

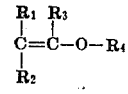

where $R_1$, $R_2$, and $R_3$ are each hydrogen, an alkyl radical, or an aryl radical; and $R_4$ is an alkyl radical, an aryl radical or an acyl radical.

The groups represented by $R_1$, $R_2$, and $R_3$ include hydrogen and radicals of about one to 10 carbon atoms such as alkyl radicals including methyl, ethyl, propyl, or butyl radicals; monovalent cycloaliphatic radicals such as cyclohexyl and cyclobutyl radicals; aryl radicals including alkaryl and aralkyl, for example, phenyl, methylphenyl, benzyl, phenylethylene and the like; alkenyl, for instance, vinyl, allyl, oleyl and the like; cycloalkenyl radicals, such as cyclopentadienyl and 2-cyclobutenyl; as well as alkenylaryl groups such as the vinylphenyl radical. These substituents may also include a substituted hydrocarbon radical, for example, a halo-substituted organic radical such as pentachlorophenyl or 1-bromo-3-trichloropropyl; and amino-substituted hydrocarbon group such as aminomethyl or 3-aminopropyl; a cyano-substituted hydrocarbon radical such as 3-cyanopropyl; a carboxyl-substituted radical such as 3-carboxylpropyl or a hydroxy-substituted radical such as hydroxypropyl or hydroxybutyl.

$R_4$ may be an alkyl radical of about one to 10 carbon atoms such as methyl, ethyl, propyl, or butyl radicals. Also included within this group are acyl radicals such as acetyl, propionyl, butyryl and other similar radicals, generally having between one and 10 carbon atoms; and aryl radicals, including alkaryl and aralkyl, for example, phenyl, methylphenyl, benzyl, phenylethylene and the like, generally having between one and 10 carbon atoms.

The hydroxyl-containing compound which is reacted with the vinyloxy compound may be any ethylenically unsaturated polymerizable material containing both a hydroxyl group attached to a carbon atom in the molecule and a $CH_2=C<$ or $-CH=CH-$ group. This reactant also preferably contains, in addition to the hydroxyl group, a single $CH_2=C<$ group in terminal position, which group is activate by adjacent groups such as carbonyloxy groups, namely,

, or phenyl groups, as in styrene.

Especially useful hydroxyl-containing materials are the hydroxyalkyl esters of unsaturated carboxylic acids in which the alkyl group has up to about 12 carbon atoms. This group includes acrylic acid and methacrylic acid esters of ethylene glycol and propylene glycol, such as 2-hydroxyethyl acrylate, 2-hydroxyethyl methacrylate, 2-hydroxypropyl acrylate and 2-hydroxypropyl methacrylate. Combinations of these esters are also widely used. There may also be employed similar esters of other unsaturated acids, for example, ethacrylic acid, crotonic acid, and similar acids having up to about six carbon atoms as well as esters containing other hydroxyalkyl radicals, such as hydroxybutyl esters and hydroxylauryl esters.

In addition to esters of unsaturated monocarboxylic acids, there may also be employed the mono- or diesters of unsaturated dicarboxylic acids, such as maleic acid, fumaric acid and itaconic acid, in which at least one of the esterifying groups is hydroxyalkyl. Such esters include bis(hydroxyalkyl) esters, as well as various alkylene glycol esters of such acids and mixed alkyl hydroxyalkyl esters, such as butyl hydroxyethyl maleate and benzyl hydroxypropyl maleate. The corresponding monoesters, such as the mono(hydroxyethyl), mono(hydroxypropyl) and similar alkylene glycol monoesters of maleic acid and similar acids can also be used.

Other available hydroxyl-containing compounds include polymerizable primary aliphatic alcohols having at least one terminal $CH_2=C<$ group such as allyl alcohol and its alkyl and aryl derivatives, such as, for example, methallyl alcohol or 2-phenylallyl alcohol; and polymerizable hydroxyl-containing ethers having at least one terminal $CH_2=C<$ group including the allyl ethers of glycol, such as, for example, ethylene glycol monoallyl ether or propylene glycol monoallyl ether.

Preferred hydroxyl-containing compounds are hydroxyethyl methacrylate, hydroxyethyl acrylate, hydroxypropyl methacrylate, butyl hydroxyethyl fumarate, ethyl α-(hydroxymethyl)acrylate, and butyl hydroxyethyl maleate.

The following reaction between 2-hydroxyethyl methacrylate and ethyl vinyl ether is believed to be representative of the reaction to produce the acetal-containing compound:

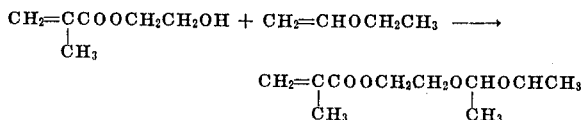

In preparing the novel acetal-containing compounds of this invention, the above-described reactants are simply mixed together, preferably with catalytic amounts of a strong acid and a free-radical inhibitor. It is also preferred to add the hydroxyl-containing compound to the vinyloxy compound in order to minimize the possibility of forming difunctional products. The hydroxyl compound is usually added dropwise to the vinyloxy compound with stirring and cooling of the mixture, preferably to temperatures below about 50° C.

It is especially preferred to employ catalytic amounts of an acid in preparing the acetal-containing compound. Among the most useful are the strong inorganic acids such as, for example, hydrochloric acid, sulfuric acid, phosphoric acid, nitric acid, boron trifluoride, aluminum trichloride and magnesium chloride, as well as various strong organic acids, such as, for example, para-toluene sulfonic acid, trichloroacetic acid and trifluoroacetic acid. The desired reaction can be effected without the addition of any such acid, or in the presence of only a weak acid, but it is then necessary to heat the mixture to higher temperatures in order to obtain a commercially feasible rate of reaction. When strong acids are utilized, however, excellent reaction rates can be obtained at temperatures of as low as about 25° C.

It is also preferred to utilize catalytic amounts of a free-radical inhibitor during the reaction. Among the most useful are quinone, hydroquinone, and phenothiazine.

The polymers of this invention, comprising the above acetal-containing compound and one or more other polymerizable ethylenically unsaturated monomers, are especially valuable when used in thermosetting coating compositions, as mentioned above. It appears that curing occurs by formation of bonds between the acetal groups, thereby linking together the polymers. Additional cross-linking sites for the acetal groups can be provided by employing monomers containing different pendant chemical groups, such as hydroxyl or carboxyl groups. Included among a wide variety of such monomers, as well as those serving solely as members of the polymer chain, are:

1. Unsaturated carboxylic acid amides such as acrylamide and methacrylamide, as well as itaconic acid diamide, alpha-ethacrylamide, crotonamide, fumaric acid diamide, maleic acid diamide and other amides of alpha, beta-ethylenically unsaturated carboxylic acids containing up to about 10 carbon atoms. Other polymerizable amide monomers, such as maleic acid, and esters thereof, and its imide derivatives such as N-carbamyl maleimide may also be utilized. Especially useful are the substituted unsaturated carboxylic acid amides in which the amide groups have a hydrogen atom replaced by the structure:

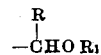

where R is selected from the group consisting of hydrogen and hydrocarbon radicals, such as methyl or ethyl radicals, and $R_1$ is a member selected from the group consisting of hydrogen and a radical derived by removing the hydroxyl group from a monohydric alcohol. Examples of such substituted amides are N-butoxymethylacrylamide, N-butoxypropylacrylamide, N-hydroxymethylacrylamide and N-hydroxypropylacrylamide.

2. Hydroxyalkyl esters of unsaturated carboxylic acids, in which the alkyl groups have up to about 12 carbon atoms, such as hydroxyethyl acrylate, hydroxyethyl methacrylate, hydroxypropyl acrylate and hydroxypropyl methacrylate, as well as combinations of these esters or similar esters of other unsaturated acids such as ethacrylic acid or crotonic acid. Also available are the mono- or diesters of unsaturated dicarboxylic acids such as maleic acid, fumaric acid and itaconic acid in which at least one of the esterifying groups is hydroxyalkyl, such as butyl hydroxyethyl maleate or benzyl hydroxypropyl maleate.

3. Mono- and di-oleofinic hydrocarbons, such as styrene, alpha-methylstyrene, alpha-ethylstyrene, alpha-butylstyrene, 1,3-butadiene, 2-methyl-1,3-butadiene, 2-chloro-1,3-butadiene and 2-bromo-1,3-butadiene and the like, as well as halogenated monoolefinic hydrocarbons, such as alpha-chlorostyrene, alpha-bromostyrene, 2,5-dibromostyrene, chloroethylene, 1,1-dichloroethylene, fluoroethylene, 1,1-difluoroethylene and the like.

4. Esters or organic and inorganic acids such as vinyl acetate, vinyl propionate, vinyl butyrate, isopropenyl acetate, isopropenyl propionate, vinyl alpha-chloroacetate, methyl acrylate, ethyl acrylate, methyl methacrylate, ethyl methacrylate, dimethyl maleate, diethyl maleate, dimethyl fumarate, diethyl fumarate and the like.

5. Organic nitriles such as acrylonitrile, methacrylonitrile, ethacrylonitrile, 3-octenenitrile, crotonitrile, oleonitrile, and the like.

6. Acid monomers such as acrylic acid, methacrylic acid, crotonic acid, 3-butenoic acid, angelic acid, tiglic acid, and the like.

7. Monomeric ketones such as isopropenyl methyl ketone, vinyl methyl ketone, and the like.

In general, it is preferred that the monomer utilized contains a single $CH_2=C\zeta$ group in terminal position, which group is activated by adjacent groups such as carbonyloxy groups, namely

, or phenyl groups, as in styrene, and an especially preferred group of monomers includes ethyl acrylate, methyl methacrylate, butyl acrylate, ethylhexyl acrylate, styrene, vinyltoluene, hydroxyethyl methacrylate, hydroxypropyl methacrylate, hydroxypropyl acrylate, hydroxyethyl acrylate, butyl hydroxyethyl fumarate and butyl hydroxyethyl maleate.

The above-described polymers are prepared according to conventional procedures utilizing standard catalysts such as organic peroxides, including benzoyl peroxide, ditertiary-butyl peroxide, and cumene hydroperoxide and azo compounds, such as alpha, alpha'-azobisisobutyronitrile, and chain-modifying agents, such as the mercaptans.

Various materials may be used as solvents, including aromatic hydrocarbons such as xylene, toluene, and other aromatic hydrocarbon solvents, including the commercial products having boiling point ranges of about 160° to 210° C.; alcohols, such as butanol, methanol and similar alkanols; ketones, such as isophorone and ethyl butyl ketone; and esters, such as ethyl acetate and butyl acetate. The type of solvent used in the polymerization is dependent mainly on the solubility parameters for both the initial monomers and the final polymer and usually a mixture of solvents is employed, such as a butanol and xylene combination.

The polymerization is typically carried out by admixing the acetal-containing compound, other monomer or monomers, and the catalysts and chain-modifying agent, if any, in the solvent, and refluxing the resulting solution for a time sufficient to obtain the desired conversion. Ordinarily, the polymerization will be complete in about 4 to 16 hours. It is often desirable to add the catalyst in increments as the polymerization progresses, and good agitation and careful temperature control are also desirable because of the rapid reaction rate and because the reaction is exothermic.

An alternative method of preparing the above-described polymers, utilizing the same vinyloxy compound, hydroxyl-containing compound and other monomers, as listed above, consists of first interpolymerizing the hydroxyl-containing compound with the other monomers, according to the polymerization procedure outlined above, and subsequently reacting this polymer with the vinyloxy compound. Acetal groups are formed by this reaction, apparently as described above, and the resulting polymer is thus substantially equivalent to the polymer as prepared by the procedure first mentioned.

The compositions described can be used as such to make clear films, but usually are used as a vehicle in compositions in which there is incorporated a pigment composition. Any conventional pigment can be used; which pigment composition may include, for example, titanium dioxide, carbon black, talc, barytes, zinc sulfate, strontium chromate, barium chromate, ferric oxide, silica and other such pigments, as well as color pigments such as cadmium yellow, cadmium red, phthalocyanine blue, chromic yellow, toluidine red, hydrated iron oxide, and the like. The enamels or coating compositions are produced by blending the vehicle and the pigment composition in accordance with well-known practice.

In ordinary usage of the coating compositions of this invention, they are applied to the article to be coated, for example, by spraying or by similar conventional techniques, and then baked to form a hard, adherent film. Typical baking schedules include 250° F. for 60 minutes to 450° F. for 10 minutes.

There are set forth below several examples which illustrate the nature and properties of both the novel acetal-containing compounds of this invention and the polymers containing such compounds. However, the invention should not be considered as being limited to their details. All parts and percentages are by weight unless otherwise specified.

EXAMPLE 1

A mixture of 130.2 grams (1.00 mole) of hydroxyethyl methacrylate, 0.25 milliliter of concentrated hydrochloric acid and 0.5 gram of hydroquinone was added dropwise over a period of 20 minutes to 75.7 grams (1.05 mole) of ethyl vinyl ether, while the temperature was kept below 35° C. by external cooling. After the addition was complete, the mixture was stirred at room temperature for 4 hours, treated with 3 grams of solid sodium bicarbonate and stirred for an additional 5 hours. The mixture was then filtered and distilled after addition of 1.0 gram of phenothiazine. There was obtained 187 grams (93 percent) of 2-(1-ethoxyethoxy)-ethyl methacrylate, b.p. 60°–90° C./0.05 mm. (mostly at 60°–70° C.), having a refractive index of 1.4305, and showing no hydroxyl band in the infrared.

EXAMPLE 2

An acetal-containing compound was prepared as above, but was not distilled. Instead, it was evacuated at room temperature for 5 hours to obtain 193 grams (96 percent) of the monomer, refractive index 1.4317, whose infrared spectrum did not show any hydroxyl group.

EXAMPLE 3

A mixture of 195.0 grams (1.50 mole) of hydroxyethyl methacrylate, 0.5 gram of hydroquinone and 0.25 milliliter of concentrated hydrochloric acid was added dropwise over a period of 30 minutes to 150 grams (1.50 mole) of isobutyl vinyl ether. The temperature was kept below 35° C. by occasional cooling. The mixture was stirred at room temperature for 4 hours and treated with 20 grams of sodium bicarbonate. Stirring was continued for an additional 5 hours, the mixture was filtered and distilled to obtain 306 grams (89 percent) of 2-(1-isobutoxyethoxy)ethyl methacrylate, b.p. mostly about 85° C./0.05 mm. Calculated analysis for $C_{12}H_{22}O_4$: C, 62.58; H, 9.63. Found: C, 62.42; H, 9.55.

EXAMPLE 4

The materials and procedure of example 1 were followed, except that hydroxyethyl acrylate was substituted for the hydroxyethyl methacrylate. 2-(1-ethoxyethoxy)ethyl acrylate was obtained in 80 percent yield, b.p. 58°–64° C./0.05 mm., index of refraction 1.4295. The monomer showed a trace of hydroxy and a strong band at 5.86 microns and a medium doublet at 6.15 microns in the infrared. Analysis indicated for $C_9H_{16}O$: C, 57.43; H, 8.57, Found: C, 58.84; H, 8.47.

EXAMPLE 5

The materials and procedure of example 1 were followed, except that hydroxypropyl methacrylate was substituted for the hydroxyethyl methacrylate. 2-(1-ethoxyethoxy)propyl methacrylate was obtained in 88 percent yield, b.p. 68°–74° C./0.05 mm., refractive index 1.4298. The monomer showed a trace of hydroxyl group, a strong band at 5.87 microns and a medium band at 6.17 microns in the infrared. Analysis calculated for $C_{11}H_{20}O_4$: C, 61.08; H, 9.33. Found: C, 61.09; H, 9.56.

EXAMPLE 6

To a mixture of 1,340 grams (3.0 mole) of 51.6 percent butyl hydroxypropyl maleate (in xylene) and 1.5 milliliter of concentrated hydrochloric acid there was added dropwise over a period of ½ hour 216 grams (3.0 mole) of ethyl vinyl ether while the temperature was kept below 40° C. by cooling. The mixture was then stirred at room temperature for 4 hours, then treated with 30 grams of solid sodium bicarbonate, and stirring was continued for an additional 8 hours. The mixture was then evaporated at 0.1 ml. and about 35° C., cooled and filtered. There was obtained 830 grams (95 percent) of 2-(1-ethoxyethoxy)propyl butyl maleate, refractive index 1.4476, showing no hydroxyl band, a strong band at 5.85 microns and a medium band at 6.15 microns in the infrared.

EXAMPLE 7

To a mixture of 595 grams (2.00 mole) of 73 percent butyl hydroxyethyl fumarate (in xylene) and 1.5 gram of concentrated sulfuric acid there was added dropwise over a period of 45 minutes 151 grams (2.10 mole) of ethyl vinyl ether while the temperature was maintained below 40° C. by cooling. After stirring the mixture at room temperature for 4 hours, it was treated with 20 grams of solid sodium bicarbonate, and stirring was continued for an additional 5 hours. Xylene and other volatile materials were removed by evacuating at 40° C. and 0.1 mm. and the residue was cooled and filtered to obtain 503 grams (87 percent) of 2-(1-ethoxyethoxy)ethyl butyl fumarate, having a refractive index of 1.4486, and showing no hydroxyl band, a strong band at 5.85 microns, a medium band at 6.13 microns and one at 12.9 microns in the infrared.

EXAMPLE 8

To 37.0 grams (0.51 mole) of ethyl vinyl ether, there was added dropwise with stirring 65.0 grams (0.50 mole) of ethyl α-(hydroxymethyl) acrylate containing 0.1 milliliter concentrated hydrochloric acid and 0.25 gram of hydroquinone. The addition took 15 minutes, and the temperature was kept below 35° C. by occasional cooling. The mixture was then stirred at room temperature for 4 hours, then treated with 1.5 gram of solid sodium bicarbonate and allowed to stand for 8 hours. The mixture was filtered and the filtrate distilled with 0.5 gram of phenothiazine to obtain 91 grams (90 percent) of ethyl α-[(1-ethoxyethoxy)methyl]acrylate, b.p. 52°–60° C./0.05 mm. The analytical sample was obtained by redistillation, having a b.p. of 50°–56° C./0.05 mm., a refractive index of 1.4311; showing no hydroxyl band, a strong band at 5.85 microns, and a medium band at 6.13 microns in the infrared. Analysis calculated for $C_{10}H_{18}O_4$: C, 59.38; H, 8.97. Found: C, 59.28; H, 9.08.

EXAMPLE 9

In preparing a polymer of this invention, a reaction vessel was charged with the following:

|  | Parts by Weight |
| --- | --- |
| Acetal-containing compound of example 1 | 20 |
| 2-Hydroxyethyl methacrylate | 10 |
| Methyl methacrylate | 35 |
| Ethyl acrylate | 25 |
| Ethylhexyl acrylate | 5 |
| Acrylamide | 5 |
| Butanol | 25 |
| Xylene | 75 |
| t-Dodecyl mercaptan | 2.5 |
| Azo-bis(isobutyronitrile) (catalyst) | 0.8 |

The mixture was refluxed for 3 hours at temperatures between 90° and 100° C., after which an additional 0.2 parts of catalyst was added and refluxing was continued for another 2 hours. The resulting interpolymer solution had a percent solids content of 47.9 and a Gardner viscosity of $Z_2$. The composition was applied to a steel panel and baked for 30 minutes at 350° F.

In order to qualitatively determine the extent of cross-linking of the polymer, the cured film was rubbed with a cloth soaked in xylene, 40 passes being made. In this test, any dissolving of the film is considered evidence of incomplete cross-linking. It was found that the polymer of this example was entirely undissolved, indicating the extent of cross-linking to be virtually complete.

EXAMPLE 10

A polymer of this invention, prepared as in example 9, comprises the following materials:

|  | Parts by Weight |
| --- | --- |
| Acetal-containing compound of example 1 | 20 |
| Methyl methacrylate | 45 |
| Ethyl acrylate | 20 |
| Acrylamide | 5 |
| t-Dodecyl mercaptan | 0.1 |
| Azo-bis(isobutyronitrile) | 1.0 |
| Butanol | 25 |
| Xylene | 75 |

The resulting product has a percent solids content of 46.8 and a Gardner viscosity of $X^-$. The polymer system was tested as in example 9 and cross-linking was found to be excellent.

EXAMPLE 11

A polymer of this invention was prepared, as in example 9, utilizing styrene as a monomeric material. The composition comprised the following materials:

|  | Parts by Weight |
| --- | --- |
| Acetal-containing compound of example 1 | 20 |
| Butylhydroxyethyl fumarate | 10 |
| Styrene | 30 |
| Methyl methacrylate | 7 |
| Ethyl acrylate | 25 |
| Ethylhexyl acrylate | 5 |
| Acrylamide | 3 |
| t-Dodecyl mercaptan | 0.5 |
| Azo-bis(isobutyronitrile) | 1.0 |
| Butanol | 10.0 |
| Xylene | 90.0 |

The resulting product has a percent solids content of 45 and a Gardner viscosity of R–S. Excellent coatings were produced therefrom.

EXAMPLE 12

A polymer of this invention was prepared, as in example 9, utilizing a different acetal-containing compound. The composition comprised the following materials:

|  | Parts by Weight |
| --- | --- |
| Acetal-containing compound of Example 7 | 20 |
| 2-Hydroxyethyl methacrylate | 10 |
| Methyl methacrylate | 30 |
| Ethyl acrylate | 28 |
| Ethylhexyl acrylate | 10 |
| Acrylamide | 2 |
| t-Dodecyl mercaptan | 0.1 |
| Azo-bis(isobutyronitrile) | 1.0 |
| Butanol | 10 |
| Xylene | 90 |

The resulting product had a percent solids content of 49.3 and a Gardner viscosity of W⁻. The composition was applied to a steel panel, baked for 30 minutes at 350° F. and tested as in example 9. Completely satisfactory cross-linking was found to result.

EXAMPLE 13

A polymer of this invention was prepared, as in example 9, utilizing styrene as a monomer. The composition comprised:

| | Parts by Weight |
|---|---|
| Acetal-containing compound of Example 7 | 10 |
| Butyl hydroxyethyl fumarate | 5 |
| Styrene | 30 |
| Ethylhexyl acrylate | 25 |
| Methyl methacrylate | 30 |
| Azo-bis(isobutyronitrile) | 1.0 |
| Butanol | 10.0 |
| Xylene | 90.0 |

The resulting product had a percent solids content of 42.6 and a Gardner viscosity of G-H. The extent of cross-linking was found to be virtually complete.

EXAMPLE 14

A polymer of this invention was prepared, as in Example 9, utilizing a different acetal-containing compound. The composition comprised:

| | Parts by Weight |
|---|---|
| Acetal-containing compound of Example 6 | 20 |
| Butyl hydroxyethyl maleate | 10 |
| Ethylhexyl acrylate | 10 |
| Methyl methacrylate | 58 |
| Acrylamide | 2 |
| t-Dodecyl mercaptan | 0.1 |
| Azo-bis(isobutyronitrile) | 1.0 |
| Butanol | 10 |
| Xylene | 90 |

The resulting product has a percent solids content of 45.9 and a Gardner viscosity of 5. Excellent coatings were produced therefrom.

EXAMPLES 15–17

Three polymer systems were prepared, each utilizing a different acetal-containing compound selected from the group consisting of 2-(1-ethoxyethoxy)ethyl acrylate (Monomer A), 2-(1-ethoxyethoxy)propyl methacrylate (Monomer B), 2-(1-isobutoxyethyl)ethyl methacrylate (Monomer C). The composition of each polymer system comprised the following materials:

| | Parts by Weight |
|---|---|
| Acetal-containing compound | 20 |
| 2-Hydroxyethyl methacrylate | 10 |
| Methyl methacrylate | 37 |
| Ethyl acrylate | 25 |
| Ethylhexyl acrylate | 5 |
| Acrylamide | 3 |
| t-Dodecyl mercaptan | 2.5 |
| Azo-bis(isobutyronitrile) | 1.0 |
| Butanol | 25 |
| Xylene | 75 |

The composition prepared using Monomer A had a percent solids content of 50.4 and a Gardner viscosity of N–O; the composition prepared utilizing Monomer B had a percent solids content of 51.0 and a Gardner viscosity of R–S; and the composition prepared using Monomer C had a percent solids content of 50.4 and a Gardner viscosity of R. Each composition was applied to a steel panel, baked for 30 minutes at 350° F. and tested as in example 9. Excellent curing was exhibited by each of the three polymer systems.

According to the provisions of the patent statutes, there are disclosed above the invention and what are now considered to be its best embodiments. However, it is to be understood that, within the scope of the appended claims, the invention may be practiced otherwise than as specifically described.

I claim:

1. An interpolymer of a polymerizable unsaturated acetal-containing monomer and at least one other ethylenically unsaturated polymerizable monomer, said acetal-containing monomer being represented by the formula:

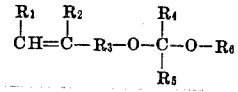

where $R_1$ and $R_2$ are each hydrogen, an alkyl radical, an aryl radial or a carbalkoxy radical; $R_3$ is a divalent organic radical; $R_4$ is hydrogen, an alkyl radical or an aryl radical; $R_5$ is an alkyl radical or an aralkyl radical; and $R_6$ is an alkyl radical, an aryl radical or an acyl radical.

2. The interpolymer of claim 1 wherein at least one of the monomers is a polymerizable, unsaturated carboxylic acid amide characterized by having at least one of its hydrogen atoms replaced by the structure:

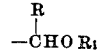

where R is selected from the group consisting of hydrogen and hydrocarbon radicals, and $R_1$ is a member selected from the class consisting of hydrogen and a radical derived by removing the hydroxyl group from a monohydric alcohol.

3. The interpolymer of claim 1 wherein at least one monomer is hydroxyethyl methacrylate, hydroxyethyl acrylate, hydroxypropyl methacrylate, butyl hydroxyethyl fumarate, or butyl hydroxyethyl maleate.

4. A thermosetting coating composition in which the vehicle comprises the interpolymer of claim 1.

5. A method of producing a novel thermosetting polymer which comprises reacting a hydroxyl-containing interpolymer with a vinyloxy compound, said vinyloxy compound having the formula:

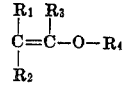

where $R_1$ is hydrogen, an alkyl radical, or an aryl radical; $R_2$ is hydrogen, an alkyl radical or an aryl radical; $R_3$ is hydrogen, an alkyl radical, or an aryl radical; and $R_4$ is an alkyl radical, an aryl radical or an acyl radical.

* * * * *